United States Patent [19]

Anderson et al.

[11] Patent Number: 4,963,609

[45] Date of Patent: Oct. 16, 1990

[54] LOW SMOKE AND FLAME-RESISTANT COMPOSITION

[75] Inventors: Jerrel C. Anderson, Vienna, W. Va.; Subhash V. Gangal, Hockessin, Del.; Dewey L. Kerbow, Vienna, W. Va.; Charles W. Stewart, Newark, Del.

[73] Assignee: E. I. Du Pont de Nemours and Company, Wilmington, Del.

[21] Appl. No.: 430,138

[22] Filed: Nov. 1, 1989

[51] Int. Cl.$^5$ .............................................. C08K 3/22
[52] U.S. Cl. .................................... 524/413; 428/378; 174/110 FC; 524/432
[58] Field of Search ................ 524/413, 432; 428/378, 428/422; 174/110 FC

[56] References Cited

U.S. PATENT DOCUMENTS

| | | | |
|---|---|---|---|
| 3,005,795 | 10/1961 | Busse et al. | 525/154 |
| 3,624,250 | 11/1971 | Carlson | 526/247 |
| 4,155,823 | 5/1979 | Gotcher et al. | 526/254 |
| 4,267,098 | 5/1981 | Hartwimmer et al. | 174/110 FC |
| 4,677,175 | 6/1987 | Ihara et al. | 526/254 |
| 4,708,975 | 11/1987 | Shain | 524/94 |
| 4,770,937 | 9/1988 | Yagyu et al. | 174/110 FC |

*Primary Examiner*—Veronica P. Hoke

[57] ABSTRACT

A low smoke and flame-resistant fluoropolymer composition, useful as insulation in a plenum cable and comprised of a base polymer of ethylene units, tetrafluoroethylene and/or chlorotrifluoroethylene units, and fluorine-containing, non-telogenic termonomer units; a metal oxide; and a polytetrafluoroethylene drip suppressant.

13 Claims, No Drawings

LOW SMOKE AND FLAME-RESISTANT COMPOSITION

BACKGROUND OF THE INVENTION

1. Field of the Invention

This invention relates to a polymeric composition based on tetraflyoroethylene (TFE) and ethylene (E) or chlorotrifuloroethylene (CTFE) and ethylene, which composition has sufficient flame resistance, drip resistance, and low smoke evolution to pass the Underwriter's Laboratory (UL) 910 Steiner Tunnel Test when burned in the form of insulation on wires which are bundled into a 25-pair jacketed cable. The composition is useful as insulation in plenum cable.

2. Background

In commercial buildings, the space between the false ceiling and the floor above is called a plenum and is commonly used for ventilation. If the plenum contains flammable materials, it can cause rapid spread of any fire that starts in the building. For this reason, regulations for the flame spread and smoke evolution of materials, such as communication cables, which are present in the plenum have become much more stringent in certain localities. It is now required in many locations that these cables pass the UL 910 "Test Method for Fire and Smoke Characteristics of Electrical and Optical Fiber Cables used in Air-Handling Spaces".

In some instances, the insulation on the wires in these cables is made of polyvinylidene fluoride (PVDF), which may provide difficulties in extrusion, both in startup and in long-term operation at the high temperatures required for extrusion. There is a need, therefore, for an insulation composition having good extrusion performance and good color stability at extrusion temperatures and which also gives the end-use jacketed cable a combination of flame resistance, low smoke evolution, and no flaming drips which can spread the fire.

Known copolymers of tetrafluoroethylene and ethylene (ETFE) are easy to extrude. Such known ETFE copolymers commonly contain a small amount of another fluoromonomer to provide for good physical properties at high temperatures. U.S. Pat. No. 4,677,175 discloses that the flame retardant properties of ETFE copolymers are better when the ethylene content is lower, but Comparative Example B provided herein below shows that this technology alone does not enable a cable to pass the UL 910 test.

U.S. Pat. No. 4,155,823 discloses that $TiO_2$ or $Sb_2O_3$ plus $TiO_2$ may be used in crosslinked ETFE, with flame retardant properties being ascribed to the $Sb_2O_3$. However, the discovery of an easily extrudable, ETFE insulation composition which enables a jacketed 25-pair cable to pass the UL 910 test has not been disclosed.

U.S. Pat. No. 3,005,795 (commonly assigned) discloses the use of PTFE as a way of increasing the melt viscosity of thermoplastics, and this material has been used as a drip suppressant in a thermoplastic cable jacket, as in U.S. Pat. No. 4,708,975.

SUMMARY OF THE INVENTION

The invention herein resides in a melt-processible fluoropolymer composition comprising:

(1) an ethylene copolymer (the base polymer) consisting of 25-43 mole % ethylene monomer units, 0.2 to 2 mole % monomer units of a fluorine-containing, copolymerizable, non-telogenic termonomer of the formula selected from $RCF=CF_2$, $R,CH=CH_2$, and $ZOCF=CF_2$. In these formulas R is a normal perfluoroalkyl group of 1-5 carbon atoms, preferably 3-5 carbon atoms, R' is a normal perfluoroalkyl group of 3-5 carbon atoms, preferably 4 carbon atoms, and Z is a normal perfluoroalkyl group of 1-4 carbon atoms, preferably 2-4 carbon atoms, and the balance, to 100%, of monomer units selected from the class consisting of TFE and CTFE monomer units, and mixtures thereof;

(2) an effective smoke suppressant and flame retardant amount, at least 0.5 weight %, of a metal oxide selected from the class consisting of $TiO_2$, ZnO, and mixtures thereof; and (3) an effective drip suppressant amount, preferably at least 0.1 weight %, of a non-melt-processible, dispersion-polymerized, fine powder polytetrafluoroethylene (PTFE).

The composition is especially useful as an insulative coating, and will pass the aforesaid UL 910 test when subjected thereto as part of a cable structure that is formed by:

(a) coating American Wire Gauge (AWG) No. 24 copper wire with the composition of the invention, and then (b) jacketing 25 twisted pairs of the coated copper wire to form the cable structure which is subjected to the test.

The invention also resides in wire coated with the above composition and in cable comprised of a plurality of such coated wires.

DETAILED DESCRIPTION OF THE INVENTION

The base polymer used in the composition of this invention is a terpolymer of ethylene (E), tetrafluoroethylene (TFE) and/or chlorotrifluoroethylene (CTFE), and 0.2 to 2 mole % of a copolymerizable termonomer which is fluorine-containing and non-telogenic, to give a side chain containing at least one, preferably at least two, carbon atoms. Such terpolymers have better elongation at elevated temperatures, as disclosed in U.S. Pat. No. 3,624,250. Since plenum cables are ordinarily subjected to a temperature of at or near room temperature during use, termonomer contents of less than 1 mole % will often be acceptable in the base polymer. The termonomer content is preferably no higher than that necessary to provide the high temperature elongation required for the use.

The termonomer used in the preparation of the base polymer is of the formula selected from $RCF=CF_2$, $R,CH=CH_2$, and $ZOCF=CF_2$. In these formulas R is a normal perfluoroalkyl group of 1-5 carbon atoms, preferably 3-5 carbon atoms, R' is a normal perfluoroalkyl group of 3-5 carbon atoms, preferably 4 carbon atoms, and Z is a normal perfluoroalkyl group of 1-4 carbon atoms, preferably 2-4 carbon atoms. The preferred termonomer is perfluoro(n-propyl vinyl ether).

The base polymer must contain 25-43 mole %, preferably 32-43 mole %, ethylene monomer units. If the ethylene content is higher than 43 mole %, the flame resistance will be poor. If the ethylene content is lower than 25-32 mole %, the physical properties will be less attractive. For this reason the preferred minimum ethylene content is 32 mole %. Synthesis of the base polymer is carried out using techniques known in the art. The TFE copolymers of this invention can be prepared by the nonaqueous polymerization system disclosed in German Pat. No. 1,806,097, which comprises bringing the monomers together in a chlorofluorocarbon solvent at a temperature of 30° to 85° C. and in the presence of a polymerization initiator that is active at such temperature.

The CTFE copolymers of this invention are preferably prepared in a nonaqueous polymerization system by a process described in European Polymer Journal 3, 129–144 (1967). For the polymer to have a high melting point, the polymerization temperature should be less than 20° C., preferably less than 10° C. A good balance of properties can be obtained at polymerization temperatures of −10° C to +10° C.

The smoke suppressant and flame retardant additive is $TiO_2$ and/or $ZnO$; $TiO_2$ is preferred. It is surprising that $TiO_2$ and $ZnO$ are more effective in ETFE than $TiO_2/Sb_2O_3$, preferred in U.S. Pat. No. 4,155,823. The most effective grades of $TiO_2$ are "Plastic" or "Polymer" grades, which have good dry dispersability and are somewhat superior in smoke suppressant and flame retardant effectiveness. They comprise a rutile structure having a particle size generally less than 0.3 micrometer.

The amount of the aforesaid metal oxide required to pass the UL 910 test in the form of a jacketed cable depends somewhat on the other ingredients in the formulation, but it is always at least 0.5 weight %. If too little metal oxide is used, peak smoke will be excessive. If too much metal oxide is used, extrusion becomes more difficult. This will usually not occur if the metal oxide content is below 5% by weight.

In addition to a properly-selected base resin and a suitable smoke suppressant and flame retardant, it is necessary to include a non-flammable drip suppressant to enable the jacketed cable to pass the UL 910 test. The drip suppressant of choice, which adds little or no fuel to the composition, is a PTFE "fine powder". This material is made by the dispersion polymerization process and, although it may contain very small amounts of copolymerized termonomers, it is always non-melt-processible. It is not critical which fine powder is employed, among those known in the art.

Enough drip suppressant fine powder is used to reduce dripping to pass the UL 910 test. Usually, effective results are obtained with 0.1 weight % fine powder. If a PTFE with particularly low fibrillation tendency is used, amounts of up to 5 weight % may be tolerated. If too much PTFE is used, the melt swell will be excessive in the melt extrusion step. The preferred amount of drip suppressant is 0.2 to 2.0 weight %.

The method of mixing the various ingredients of the composition of the invention is not critical. A simple and effective way is to dry blend the ingredients in a finely divided form and then melt extrude the mixture onto wire.

EXAMPLE 1

The composition of the invention used in this example consisted of an ETFE terpolymer (37.7 mole % ethylene; 61.6 mole % TFE, and 0.6 mole % PPVE), 2 wt % $TiO_2$ (Du Pont R-101) and 0.2 wt % non-melt-processible, dispersion-polymerized, PTFE fine powder (Du Pont Teflon ® CFP 6000). The three ingredients were dry blended, melt blended in an extruder, and then extruded as a 127 micrometer coating on 508 micrometer solid bare copper wire (AWG 24). Twenty-five twisted pairs of these wires were extrusion-jacketed with a 300 micrometer coating of polyvinylidene fluoride (PVDF; Kynar ® Flex 2800). This cable was tested in accordance with the Underwriters, Laboratory UL 910 "Test Method for Fire and Smoke Characteristics of Electrical and Optical Fiber Cables used in Air-Handling Spaces," using the UL Steiner Tunnel. The cable passed the test, as shown below. The values in parentheses are the maximum allowable values under the test.

|  | Flame Propagation Values |
| --- | --- |
| Distance |  |
| Feet | 3.5(5.0) |
| Meters | 1.07(1.52) |
| Optical Density |  |
| Peak | 0.43(0.50) |
| Average | 0.11(0.15) |

COMPARATIVE EXAMPLE A

This example shows that the UL test is not passed when the $TiO_2$ content is 1.5%, a non-effective amount, instead of 2.0%. The base polymer of Example 1 was mixed with 1.5 wt % $TiO_2$ of the same kind used in Example 1 and 0.25 wt % (rather than the 0.2 % of Example 1) of CFP 6000. The blend was extruded onto AWG 24 wire as a coating 127 micrometers thick, and 25 twisted pairs of the wire were covered with a jacket of 300 micrometers of the same PVDF that was used in Example 1. The UL 910 test gave the following results, which do not pass the requirements of the test.

|  | Flame Propagation Values |
| --- | --- |
| Distance |  |
| Feet | 4.0(5.0) |
| Meters | 1.22(1.52) |
| Optical Density |  |
| Peak | 0.70(0.50) |
| Average | 0.13(0.15) |

COMPARATIVE EXAMPLE B

This example was carried out as in Example 1 but with just the ETFE base polymer which was extruded onto AWG 24 wire in a coating 136 micrometers thick; 25 pairs of the coated wire were jacketed with micrometers of Kynar ® Flex 2800.

|  | Flame Propagation Values |
| --- | --- |
| Distance |  |
| Feet | 19.5(5.0) |
| Meters | 5.9(1.52 |
| Optical Density |  |
| Peak | 1.11(0.50) |
| Average | 0.29(0.15) |

COMPARATIVE EXAMPLE C & D

These examples show that it is much more difficult for a 25-twisted-pair cable to pass the UL-910 test than for a 4-twisted-pair cable to pass the test. In both of these examples the ETFE base polymer consisted of 42.7 mole % ethylene, 55.7 mole % TFE, and 1.6 mole % perfluorobutyl ethylene repeat units. In these examples no $TiO_2$ or PTFE was added. This polymer was extruded onto AWG 24 wire in a coating 127 micrometers thick.

In Comparative Example C four twisted pairs of the coated wire were jacketed with 300 micrometers of Kynar ® Flex 2800, and in Comparative Example D twenty-five twisted pairs were jacketed with 300 micrometers of Kynar ® Flex 2800. The following results show that in the UL 910 test, the four-pair cable gave strikingly better results than the twenty-five-pair cable.

|  | Flame Propagation Values | |
| --- | --- | --- |
|  | C | D |
| Number of pairs | 4 | 25 |
| Distance |  |  |
| Feet | 1.5(5.0) | 4.5(5.0) |
| Meters | 0.46(1.52) | 1.37(1.52) |
| Optical Density |  |  |
| Peak | 0.20(0.50) | 0.94(0.50) |
| Average | 0.04(0.15) | 0.16(0.15) |

COMPARATIVE EXAMPLE E

Comparative Example E, also with four twisted pairs, shows that lower ethylene content in the base polymer helps the performance of an ETFE polymer in the UL 910 test. In Comparative Example E, the ETFE polymer contained 47.5 mole % ethylene units, 51.5 mole % TFE units, and 1 mole % perfluorobutyl ethylene units. It was extruded onto AWG 24 wire in a coating of 127 micrometers thickness. Four twisted pairs of coated wire were jacketed with 300 micrometers of Kynar ® Flex 2800. Two separate burning tests were carried out on identical cable samples, and the results are compared below with those of Comparative Example C. The results shown for E are the mean of the two tests.

|  | Flame Propagation Values | |
| --- | --- | --- |
|  | C | E |
| Mol % ethylene | 41.7 | 48 |
| Distance |  |  |
| Feet | 1.5 | 3.75(5.0) |
| Meters | 0.46 | 1.14(1.52) |
| Optical Density |  |  |
| Peak | 0.20 | 0.35(0.50) |
| Average | 0.04 | 0.055(0.15) |

EXAMPLE 2

The same base polymer as that used in Comparative Examples C and D was dry blended with 1 wt % $TiO_2$ (an effective amount) and 1 wt % of a non-melt-processible, dispersion-polymerized, modified PTFE fine powder containing 0.3 weight % hexafluoropropylene units and less than 0.1 weight % perfluorobutyl ethylene units. The three dry blended ingredients were melt blended and then extruded as a 127 micrometer coating onto AWG 24 wire. Twenty-five twisted pairs of these wires were extrusion jacketed with a 300 micrometer coating of Kynar ® Flex 2800 polyvinylidene fluoride. On testing in accordance with UL 910, the cable passed the test, the test data being shown below under Example 3.

EXAMPLE 3

The ETFE base polymer was a terpolymer (34.7 mole % of ethylene, 64.6 mole % TFE, and 0.7 mole % perfluoro(propyl vinyl ether) (PPVE). It was dry blended with 1 wt % $TiO_2$ and 1 wt % of the same PTFE fine powder used in Example 2, then extruded as a 140 micrometer coating onto AWG 24 wire. Twenty-five twisted pairs of these wires were extrusion jacketed with a 390 micrometer coating of Kynar ® Flex 2800 polyvinylidene fluoride. On testing in accordance with UL 910, the cable passed the test, as shown below.

|  | Flame Retardant Values | |
| --- | --- | --- |
|  | Ex. 2 | Ex. 3 |
| Distance |  |  |
| Feet | 3.5 | 3.5(5.0) |
| Meters | 1.07 | 1.07(1.52) |
| Optical Density |  |  |
| Peak | 0.47 | 0.37(0.50) |
| Average | 0.09 | 0.08(0.15) |

Two other tests were made with cables. In the first, Example 2 was repeated except that the ETFE base polymer used was the same as that of Example 1. In the second, Example 2 was repeated except that the ETFE base polymer consisted of 36 mole % ethylene, 62.4 mole % TFE, and 1.6 mole % perfluorobutyl ethylene repeat units. The cables were tested in accordance with UL 910 and the results are shown below.

|  | Flame Propagation Values | |
| --- | --- | --- |
|  | 1 | 2 |
| Distance |  |  |
| Feet | 4.0 | 4.5(5.0) |
| Meters | 1.23 | 1.37(1.52) |
| Optical Density |  |  |
| Peak | 0.73 | 0.84(0.50) |
| Average | 0.12 | 0.12(0.15) |

As is apparent, they did not pass the peak optical density requirement, but did pass the other requirements. It is believed that they would pass all requirements if the insulation contained an increased amount of $TiO_2$ or an adequate amount of ZnO.

EXAMPLE 4

This example shows the effectiveness of ZnO in the composition of the invention. The composition was not tested under UL 910 as were the compositions of Examples 1–3. Thermogravimetric analysis (TGA) in air at a heating rate of 20° C./minute was carried out with (a) an ETFE resin (47.3 mole % ethylene, 52.5 mole % TFE, and 0.2 mole % $C_4F_9CH=CH_2$),
(b) the same resin as (a) containing 1 wt % $TiO_2$, and
(c) the same resin as (a) containing 1 wt % ZnO.

The inflection points in the TGA curves were:
(a) 473° C. with no metal oxide
(b) 489° C. with $TiO_2$
(c) 505° C. with ZnO This indicates that ZnO is more effective than $TiO_2$ in stabilizing ETFE copolymers toward thermal decomposition, one of the steps in combustion.

EXAMPLE 5

The flame resistance of the ETFE copolymer of Example 4, modified with various metal oxides, was determined using a modified UL 94 test. Under the UL 94 test, each sample is exposed to a Bunsen burner flame for two 10-second burns, recording the time required for the sample to self-extinguish after each exposure. Under the modified test carried out in this example, each sample was exposed to five 10-second burns, recording the time for the sample to self-extinguish after each exposure. Dripping or running of the samples was also recorded. The burn times (in seconds) for each composition are shown below. The amount of ZnO in the composition was 2.8 parts per 100 parts of polymer; 2.5 parts per 100 parts of polymer was used for the other metal oxides.

|  | Control | ZnO | $TiO_2$ | MgO | $Al_2O_3$ |
| --- | --- | --- | --- | --- | --- |
| 1st Exposure | 0 | 0 | 0 | 0 | 0 |
| 2nd Exposure | 2 | 0 | 0 | 1 | 0 |
| 3rd Exposure | 2 | 0 | 0 | 2 | 1 |
| 4th Exposure | 2 | 0 | 1 | 2 | 2 |
| 5th Exposure | 2 | 0 | 1 | 1 | 2 |

It was observed that the control gave off flaming drips during the second 10-second exposure to the flame from the Bunsen burner, and during all subsequent exposures. The other samples gave off non-flaming drips after the second exposure and during all subsequent exposures. Note from this small scale test that ZnO and $TiO_2$ significantly improve the flame resistance of the base polymer, whereas MgO and $Al_2O_3$ are less effective.

We claim:

1. Melt-processible fluoropolymer composition comprising:
   (a) an ethylene copolymer consisting of 25–43 mole % ethylene monomer units, 0.2 to 2.0 mole % monomer units of a fluorine-containing, copolymerizable, non-telogenic termonomer of the formula selected from $RCF=CF_2$, $R'CH=CH_2$, and $ZOCF=CF_2$, in which R is a normal perfluoroalkyl group of 1–5 carbon atoms, R' is a normal perfluoroalkyl group of 3–5 carbon atoms, and Z is a normal perfluoroalkyl group of 1–4 carbon atoms, and the balance, to 100%, of monomer units selected from the class consisting of tetrafluoroethylene and chlorotrifluoroethylene monomer units, and mixtures thereof;
   (b) an effective smoke suppressant and flame retardant amount, at least 0.5 weight %, of a metal oxide selected from the class consisting of $TiO_2$, ZnO, and mixtures thereof; and
   (c) an effective drip suppressant amount of a non-melt-processible, dispersion-polymerized, fine powder polytetrafluoroethylene.
2. The composition of claim 1 in which the ethylene copolymer consists of 32–43 mole % ethylene monomer units.
3. The composition of claim 1 in which the ethylene polymer contains tetrafluoroethylene units.
4. The composition of claim 3 in which the termonomer in the ethylene polymer is perfluoro(propyl vinyl ether).
5. The composition of claim 3 in which the metal oxide is $TiO_2$.
6. The composition of claim 4 in which the metal oxide is $TiO_2$.
7. The composition of claim 1 in which R contains 3–5 carbon atoms.
8. The composition of claim 1 in which R' contains 4 carbon atoms.
9. The composition of claim 1 in which Z contains 2–4 carbon atoms.
10. A conductive wire coated with the composition of claim 1.
11. A jacketed cable comprised of the wire of claim 10.
12. The composition of claim 5 in which the $TiO_2$ comprises the rutile structure.
13. The composition of claim 6 in which the $TiO_2$ comprises the rutile structure.

* * * * *